Figure 4:
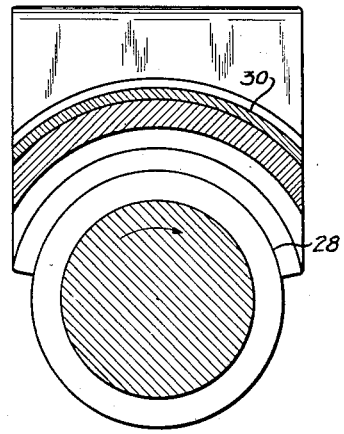

July 4, 1939.  F. S. DENNEEN ET AL  2,164,310

APPARATUS FOR HARDENING

Original Filed March 29, 1934

INVENTORS.
Francis S. Denneen
William C. Dunn.

Patented July 4, 1939

2,164,310

UNITED STATES PATENT OFFICE 2,164,310

APPARATUS FOR HARDENING

Francis S. Denneen, Cleveland, and William C. Dunn, Shaker Heights, Ohio, assignors to The Ohio Crankshaft Company, Cleveland, Ohio, a corporation of Ohio Original application March 29, 1934, Serial No. 718,002. Divided and this application November 7, 1935, Serial No. 48,750

5 Claims. (Cl. 266—4)

The present invention as a division of copending application Serial No. 718,002 filed March 29, 1934 relates to a means for producing a hardened or otherwise heat treated article. It is directed primarily to an article having a surface or zone possessing physical properties different from those of other portions of the article. Its field of application includes all articles requiring a hard surface such as crankshafts and camshafts for engines, gears for transmission machinery, bearings, and wearing surfaces for machine tools, turbines, and compressors and all purposes where heavy loads at high surface velocities are carried or where wear may occur due to imperfect lubrication, high unit pressures, or other causes.

With our apparatus and method, it is possible to control the depth, contour and hardness of the hardened zone, and to insure a proper bond between the hardened zone and the core. With a definite kind of steel susceptible to hardening, a definite contour for the conductor, a definite air gap, a definite current frequency in the conductor, and a definite current density in the conductor, the temperature and depth to which the affected zone is heated can be closely controlled merely by controlling the time of application of the heating current. Of course, one or more of the other variable factors than time may be altered for the purpose of controlling the heating.

With the temperature and depth of the heated zone closely controlled, it is then only necessary to properly quench the heated zone in order to attain the desired hardness. Having raised the zone to be hardened to the proper temperature, it is vitally important to cool that zone almost instantly, and while it is still within the proper temperature range, in order to obtain the desired hardness, and further, in order that the bond between the hardened zone and the core be strong and firm and not liable to fracture. By employing the proper current frequency and with proper control and adjustment of the other factors, the depth of the heated zone may be closely controlled, and may be kept shallow enough to make it possible to quench the entire zone fast enough to obtain the desired hardness, and to fix the physical characteristics of the steel, including its structure, within the desired limits.

To insure a proper bond between the hardened zone and the core, it is essential that the bond area contain little or no free ferrite. To attain this condition it is necessary to almost instantly cool the entire zone to be hardened, so as to fix the physical structure before appreciable segregation of the elements has occurred. Obviously, with slower heating methods which are not subject to such close control, the core will be heated to a much greater depth, involving the disposal of much more heat in the quench, preventing close control of the physical structure and detrimentally affecting the physical characteristics of the core.

While this invention is applicable broadly to all of the foregoing fields, the primary object is to provide a bearing, or other area subject to wear, with an extremely hard surface and a core of tough, ductile material. Another object is to provide a bearing in which the changes in structure along, or parallel to, the surface are gradual and thus offer no abrupt line of difference where fractures may easily start. A further object of this invention is to provide an article in which two or more surfaces on various parts of the article may be hardened simultaneously without hardening the intervening space. Another object is to provide an article in which the hardened zone may be varied as to depth and as to contour in different directions. An additional object is to provide an article having a hardened zone in which the chemical combinations of elements differ from those in an adjoining zone, but in which the qualitative and quantitive analyses as to individual elements remain substantially unchanged. Another object is to provide a means and method whereby the said article can be produced rapidly, economically and of a desired standard of quality. Another object is to provide means for producing the said article which may be adapted to automatic operation. An additional object is to provide means which require but limited space for operation. A further object is to provide means by which heating and quenching may be accomplished at a single setting. Another object is to provide means whereby certain of the steps in the process may be accomplished automatically. Another object is to provide means which may be readily adapted to articles of a variety of sizes and shapes. An additional object is to provide means for accomplishing the processes described herein which can be produced quickly and at low cost.

While in the accompanying drawing and specification we have illustrated and described our invention as applied to certain purposes, we do not limit ourselves to the construction shown and described. From the disclosure herein, obviously, many modifications and other uses will readily suggest themselves to those skilled in the art.

The appended claims define the novel features to which our invention is limited.

In said annexed drawing:—

Figure 3:
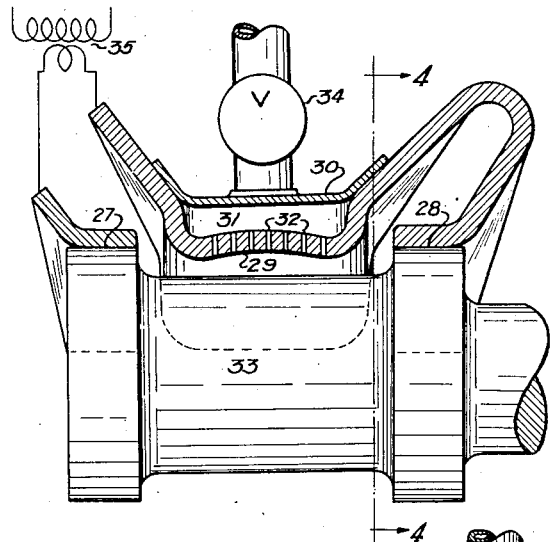
Figure 2:
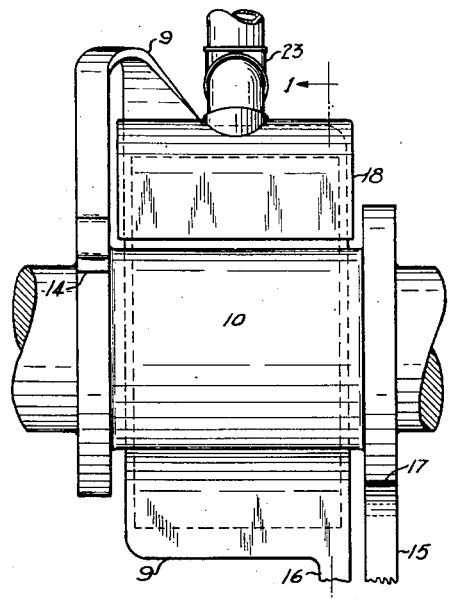
Figure 1:
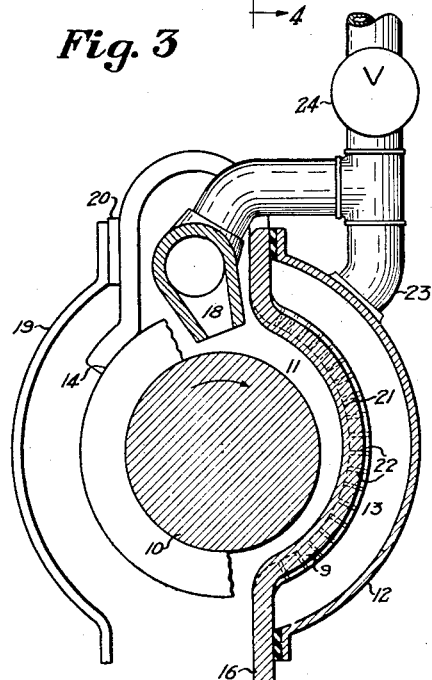

Fig. 1 shows the application of a spaced inductor embracing a portion only of the surface to be hardened and is a sectional elevation on line 1—1 of Fig. 2. Fig. 2 is a longitudinal elevation of the apparatus shown in Fig. 1 but with the shield 19 removed. Fig. 3 is a longitudinal elevation, partly in section, of a modification of the apparatus shown in Figs. 1 and 2. Fig. 4 is a section on line 4—4 of Fig. 3.

In Figs. 1 and 2 the inductor 9 is curved around a part only of the circumference of the rotating bearing 10 at a varying distance therefrom as indicated at 11. This inductor has a cover 12 forming a quench conduit 13 and one of its terminals is arranged as at 14 to contact with the surface of an adjacent and cooler part of the work. The current is supplied through the terminals 15 and 16 one of which contacts with a cool part of the work at 17. By properly forming and locating the contacts 14 and 17 and arranging them as shown in Figs. 1 and 2, the current supplied the inductor 9, after leaving the inductor, is made to flow into the piece to be heated at contact 14, then through the piece and out of contact 17, the direction of current in the piece being the reverse or opposite that of the current as it flows through the inductor. The shaft being rapidly rotated during the heating period, the heat is distributed substantially uniformly over the selected surface and when the coolant is ejected from the nozzle 18, the continued rotation of the shaft and the shape of the tapered space 11 to receive the coolant delivered to it in a tangential direction, insure a uniform quenching. A shield 19 attached to inductor 9 through the insulating members 20 serves to reduce heat loss. As a further means for controlling the heating, the face of inductor 9 is somewhat curved or otherwise formed to cause its central part as measured along the axis of the shaft or work 10 to be at a greater distance from the work than the side portions of the inductor as indicated by the broken line at 21. Orifices 22 are provided in the inductor for the flow of coolant from the jacket space 13 onto a heated surface of the shaft 10, this coolant or quench being supplied by piping 23 through valve 24. Nozzle 18 is supplied with quenching fluid from the same or other piping as conditions may require.

Heating is supplied by connecting a source of high frequency current of relatively high density across terminals 15 and 16. Such high density current is usually supplied from a transformer whose secondary 25 is connected directly to the terminals and whose primary 26 is connected to supply lines from a high frequency source of suitable characteristics.

The contacts 14 and 17 of Figs. 1 and 2 may be arranged as indicated at 27 and 28 of Figs. 3 and 4 and the inductor assumes the form substantially as shown at 29 for many applications. An outer shell 30 preferably non-conducting is attached to the inductor to provide a quench conduit space 31 and to serve as a reservoir for quenching fluid which is projected through the passages 32 in the curved portion of this inductor onto the heated surface of shaft 33 and at the proper time, the valve 34 controlling the flow. The form of the inductor, the position of the contact members 27 and 28 and speed of rotation all have an effect upon the heating action. A suitable transformer 35 supplies current of the correct frequency and voltage.

It will be evident that depending upon results to be accomplished, the inductors shown in Figs. 1 and 2 and in 3 and 4 may be made with a wide variety of changes in the matter of form, spacing from the work, area embraced, current contacts into and out from the work and distribution of coolant or quench. As Figs. 1 and 3 indicate, the general arrangement is that the current is carried through a heating inductor spaced from and substantially parallel to the surface being heated, the current being returned through the article itself and in the direction opposite that of the current in the inductor. It will be evident, also, that localized heating and quenching may be readily accomplished by the use of this apparatus without rotating or moving the article being heat treated. In this case, however, the hardened area, of course, would be limited to substantially the area embraced by the inductor.

Other modes of applying the principle of our invention may be employed instead of the ones explained, change being made as regards the means herein disclosed, provided those stated by any of the following claims or their equivalents may be employed.

We, therefore, particularly point out and distinctly claim as our invention:

1. In a device for heat treating a portion of a metallic article, a source of alternating current of high frequency, a hollow conductor, means for electrically connecting said hollow conductor to the article in series with said source and in such a manner that said conductor lies parallel and close to the surface of the article and in reverse current relation thereto, said hollow conductor having a plurality of apertures communicating with the interior thereof and directed toward the portion of the article to be heated and a valve controlled fluid pressure source in fluid connecting relation to said hollow conductor.

2. In a device for heat treating a cylindrical metallic article, a source of alternating current of high frequency, a circumferentially extending hollow conductor, means for electrically connecting said hollow conductor to the article in series with said source and in such manner that said conductor lies parallel and close to the surface of the article and in reverse current relation thereto, said hollow conductor having a plurality of apertures communicating with the interior thereof and directed toward the portion of the article to be heated and a valve controlled fluid pressure source in fluid connecting relation to said hollow conductor.

3. In a device for heat treating an elongated metallic article, a source of high frequency current, a longitudinally extending hollow conductor means for electrically connecting said hollow conductor to the article in series with said source and in such a manner that said conductor lies parallel and close to the surface of the article and in reverse current relation thereto, said hollow conductor having a plurality of apertures communicating with the interior thereof and directed toward the portion of the article to be heated and a valve controlled fluid pressure source in fluid connecting relation to said hollow conductor.

4. In a device for heat treating a metallic article, a source of high frequency current, a conductor having an enclosure associated therewith for cooling fluid, means for electrically connecting said conductor to the article in series with said source and in such a manner that said conductor lies parallel and close to the surface of the article and in reverse current relation thereto, said conductor having a plurality of apertures communicating with the enclosure and directed toward the portion of the article to be heated and a valve controlled fluid pressure source in fluid connecting relation to said enclosure.

5. In a device for heat treating a portion of a metallic article, a source of alternating current of high frequency, a hollow conductor, means for electrically connecting said hollow conductor to the article in series with said source, the conductor being connected to the article at regions removed from heated portions of the article, and in such a manner that said conductor lies parallel and close to the surface of the article and in reverse current relation thereto, said hollow conductor having a plurality of apertures communicating with the interior thereof and directed toward the portion of the article to be heated and a valve controlled fluid pressure source in fluid connecting relation to said hollow conductor.

FRANCIS S. DENNEEN.
WILLIAM C. DUNN.